United States Patent [19]

Hargis

[11] 4,126,432
[45] Nov. 21, 1978

[54] METHOD OF TREATING A GAS

[75] Inventor: Robert L. Hargis, Palestine, Tex.

[73] Assignee: Aluminum Company of America, Pittsburgh, Pa.

[21] Appl. No.: 817,336

[22] Filed: Jul. 20, 1977

[51] Int. Cl.$^2$ .................................... B01D 53/00
[52] U.S. Cl. ........................................ 55/71; 55/72; 55/82; 55/269
[58] Field of Search ......... 55/71, 72, 80, 82, 267–269; 204/67; 423/240, 495

[56] References Cited

U.S. PATENT DOCUMENTS

| | | | |
|---|---|---|---|
| 1,661,104 | 2/1928 | Barnebey | 55/269 |
| 2,617,276 | 11/1952 | Gard et al. | 55/80 |
| 2,805,979 | 9/1957 | Vermillion, Jr. | 55/80 |
| 3,904,494 | 9/1975 | Jacobs et al. | 55/82 |

Primary Examiner—Frank W. Lutter
Assistant Examiner—David L. Lacey
Attorney, Agent, or Firm—Daniel A. Sullivan, Jr.

[57] ABSTRACT

A method of treating a gas containing liquid substance, including the steps of separating liquid substance from the gas, sending the gas from the separating step to a cooling step, then, in the cooling step, cooling the gas to a temperature below the onset of solidification in the liquid substance, wherein the improvement includes removing a remaining amount of liquid substance, which remains in the gas following the step of separating and which collects in the step of sending, before such remaining amount reaches the step of cooling and accumulates as solidified liquid in the cooling step, where it would contribute to a clogging of the cooling step.

4 Claims, 2 Drawing Figures

METHOD OF TREATING A GAS

BACKGROUND OF THE INVENTION

The present invention relates to gas treating methods, in particular a method for cooling a gas below the onset of solidification of a liquid in the gas without ending up with solidified liquid plugging the system.

U.S. Pat. No. 3,904,494 entitled "Effluent Gas Recycling and Recovery in Electrolytic Cells for Production of Aluminum from Aluminum Chloride", issued Sept. 9, 1975 in the names of Stanley C. Jacobs and Ronald C. Schoener discloses a system for treating the gas emitted from a cell in which aluminum is being produced by the electrolysis of aluminum chloride. The system includes a demister. The gas coming off the cell is cooled until certain constituents in the gas condense in the form of a mist, i.e. liquid droplets suspended in the gas. The function of the demister is to remove this mist from the gas. The gas then proceeds from the demister to, for example, a shell-and-tube heat exchanger where the gas is cooled further to begin collection of solid aluminum chloride. The nature of aluminum chloride is such that it can move from the gaseous state directly to the solid state under appropriate pressure conditions, for example, atmospheric pressure.

A problem that existed for a long time in experiments on this system was that, no matter how seemingly perfect the demister was made, there always seemed to be some liquid that did not get trapped in the demister. This liquid would settle out in the conduit joining the demister with the shell-and-tube heat exchanger, and it would then drain from the conduit down into the top of the shell-and-tube heat exchanger, thence to begin plugging up the heat exchanger tubes as the liquid became solid under the temperature conditions existing in the shell-and-tube heat exchanger. Considerable time and money were spent in trying to solve this problem by perfecting the demister.

SUMMARY OF THE INVENTION

It is an object of the invention to provide a technique by which the above problem of never being able to adequately perfect the demister is overcome.

This as well as other objects which will become apparent in the discussion which follows are achieved according to the present invention by providing a method of treating a gas containing liquid substance, including the steps of separating liquid substance from the gas, sending the gas from the separating step to a cooling step, then, in the cooling step, cooling the gas to a temperature below the onset of solidification in said liquid substance, wherein the improvement comprises removing a remaining amount of liquid substance, which remains in the gas following the step of separating and which collects in the step of sending, before such remaining amount reaches the step of cooling and accumulates as solidified liquid in the cooling step, where it would contribute to a clogging of a heat exchanger employed in the cooling step.

DESCRIPTION OF THE PREFERRED EMBODIMENTS

An electrolysis cell for producing aluminum metal by the electrolysis of aluminum chloride can, for instance, have a molten salt bath of the following composition in weight percent:

NaCl — 51.0
LiCl — 40.0
$AlCl_3$ — 6.5
$MgCl_2$ — 2.5

A typical temperature at which electrolysis is carried out with such a bath is 715° C. This temperature assures that the aluminum being produced is in molten form. A cell for the electrolysis may be designed such as is illustrated in U.S. patent application Ser. No. 797,747 of Elmer H. Rogers, Jr. for "Method for Extracting Heat from a Chamber Containing a Molten Salt", filed May 17, 1977 and commonly assigned to Aluminum Company of America. The electrolysis creates chlorine gas along with the production of aluminum, and this chlorine gas must be conducted away from the cell and reused for the chlorination of aluminum oxide or else sold on the chlorine market. The vapor pressures of the various cnstituents of the molten salt bath are such that the chlorine takes with it bath constituents. A certain amount of bath can even be simply entrained in liquid form and carried out. The above-mentioned U.S. Pat. No. 3,904,494 represents a system for handling this evolved chlorine and reusing the bath constituents which are leaving with it.

As mentioned above, considerable effort had been expended trying to make a perfect demister such that the shell-and-tube heat exchanger would not get plugged up with frozen liquid. I believe my contribution was to realize that the perfect demister may never be made and that a better solution would be to live with an imperfect demister by draining off liquid which happens to escape through it.

Figure 1:
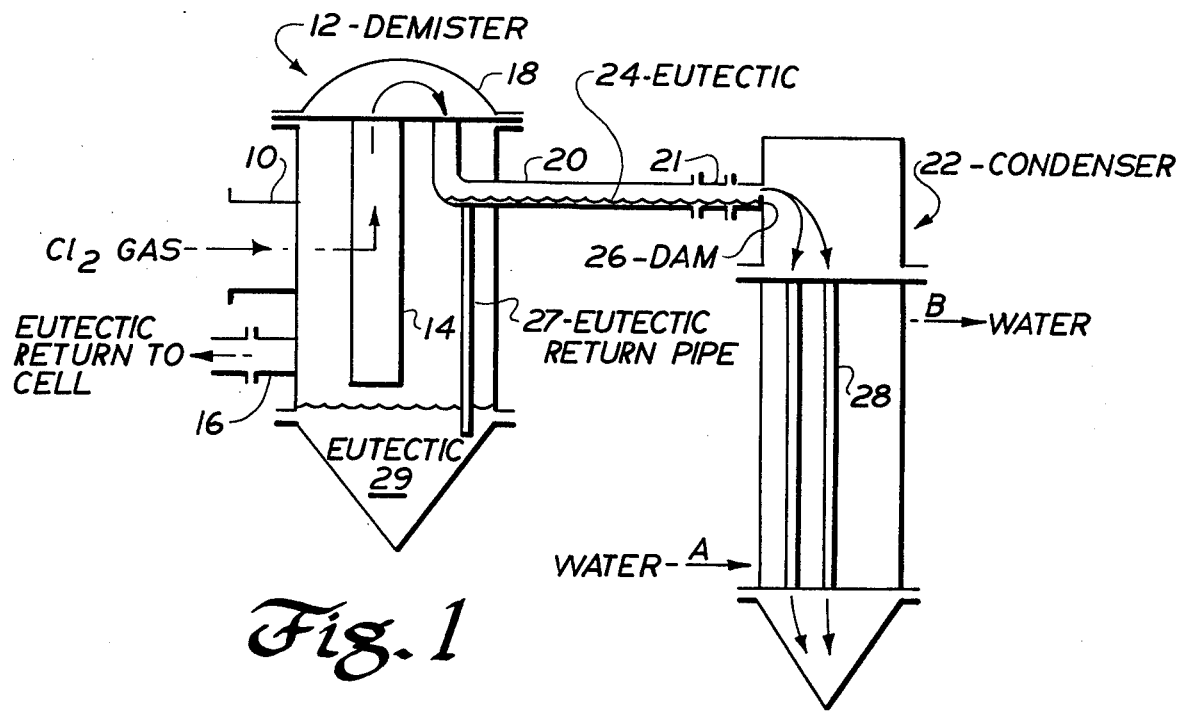
FIG. 1 is a schematic illustration of one embodiment of the invention.

A preferred embodiment is illustrated schematically in FIG. 1. It will be seen that the chlorine gas enters through port 10 into demister 12. Suspended in the demister are perforated metal tube units, of which only unit 14 is shown as an exemplary one. These units include a covering of porous material, e.g. quartz fiber matting. As will be apparent for instance from a study of U.S. Pat. No. 3,904,494, the chlorine gas before reaching the demister can already have passed through a heat exchanger so that the gas is at e.g. 150° C and contains liquid substance in mist form. Most of this mist is separated from the gas by the demister. The quartz fiber matting catches this liquid substance, which builds up to a certain extent and then begins to drop to the lower part of the demister to collect. When the level of the liquid substance builds up sufficiently, it drains out through port 16 back to the cell.

Figure 2:
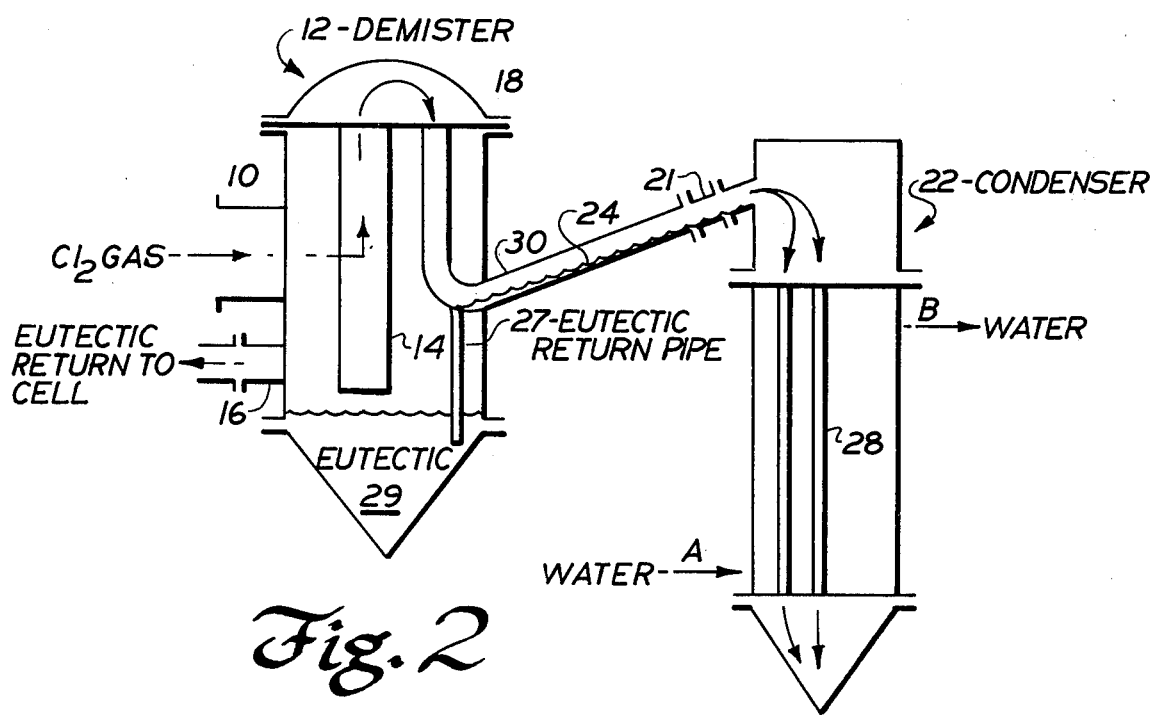
FIG. 2 is a schematic illustration of a second embodiment of the invention.

It will be noted in FIGS. 1 and 2 that the liquid substance is referred to in shorthand form as "eutectic". It does not necessarily have to be an exactly eutectic composition in terms of phase diagram theory. It may be a substance that solidifies over a temperature range, between a liquidus and a solidus. A typical weight-% composition of this liquid substance for the above bath composition and operating temperature is:

64% $AlCl_3$
36% NaCl

The gas, freed of most of the eutectic, moves up into the dome 18 of the demister and is then sent in conduit 20, which extends horizontally for example a distance of 8 feet, over to the top of the shell-and-tube heat exchanger 22. This conduit is provided with an expansion joint 21 to compensate for differential thermal expansions. The conduit may also be provided with a jacket (not shown) in which a liquid of controlled temperature, for example at 150° C, is circulated so that the problem of aluminum chloride deposition and plugging within the conduit is avoided.

The demister being less than perfect, remaining amounts of liquid substance, eutectic 24, collect in the bottom of the conduit. According to the present invention, I place a dam 26 at the conduit end connected to the heat exchanger. This dam may extend, for example, half-way up the cross section of the conduit. And, I provide a eutectic return tube 27 to extract the eutectic from the conduit and drain it into the eutectic reservoir 29 in the bottom of the demister. In this way, the eutectic is removed from the conduit as it collects there, so that it never gets a chance to overflow into heat exchanger 22, there to solidify and cause plugging.

Note that return pipe 27 is in the form of a dip tube, i.e. the pipe protrudes down into the liquid in the reservoir. Otherwise the chlorine gas coming into the demister would tend to short circuit unit 14.

Thus, by providing means for removing eutectic from conduit 20, the system of U.S. Pat. No. 3,904,494 is able to get by with a less than perfect demister. My solution is very economical and saves significant sums of money which would otherwise have to be expended in building a near perfect demister and in unjamming the heat exchanger 22 of solidified eutectic.

The gas moving over the dam 26 proceeds down into the heat exchanger 22 and moves through tubes 28 where water being circulated as indicated by arrows A and B around the tubes cools the gas temperature down to, for example, 40° C to begin nucleation and growth of aluminum chloride particles. Only two tubes 28 are shown, for purposes of illustration; in general such heat exchangers will have more than just two tubes 28. The 40° C temperature is well below the onset (the liquidus temperature) of solidification in the eutectic. It seems, in fact, to be below even the solidus of the eutectic, and thus the present invention has proven extremely important and helpful in maintaining tubes 28 free of clogging, solidified eutectic.

The embodiment of FIG. 2 is less preferred than that of FIG. 1, because it creates difficulties in properly connecting the conduit between the heat exchanger 22 and demister 12. However, technically speaking, the embodiment illustrated in this FIG. 2 is essentially the same as my embodiment of FIG. 1, the tilted conduit 30 having the same effect as my dam 26. In this figure, the same numerals have been used for structure which is the same as in FIG. 1. The only difference in this embodiment is the presence of the conduit 30 which tilts back toward the demister such that the eutectic depositing in this conduit drains back and into eutectic return pipe 27 without the need of any dam (like dam 26) protruding into the flow cross section of the conduit.

It will be understood that the above description of the present invention is susceptible to various modifications, changes, and adaptations and the same are intended to be comprehended within the meaning and range of equivalents of the appended claims.

What is claimed is:

1. A method of treating a gas containing a liquid substance, including the steps of separating substantially all of said liquid substance from the gas, sending the gas from the separating step to a cooling step which employs a heat exchanger, then, in the cooling step, cooling the gas to a temperature below that at which said liquid substance exists as a solid, wherein the improvement comprises removing a remaining amount of the liquid substance, which remains in the gas following the step of separating and which collects in the step of sending, before said remaining amount reaches the step of cooling and accumulates as solidified liquid in the cooling step, where it would contribute to a clogging of the heat exchanger employed in the cooling step.

2. A method as claimed in claim 1 wherein the step of sending is carried out in a horizontal conduit and the step of removing is effected by partially damming the conduit before the step of cooling and extracting the remaining liquid substance from the conduit at a location behind the point in the conduit at which the partial damming took place.

3. A method as claimed in claim 1 wherein the step of sending is carried out in a conduit extending between the step of separating and the step of cooling and the removing is effected in a tube extending from the conduit into the liquid substance separated in the step of separating.

4. A method as claimed in claim 1 wherein the step of separating is carried out in a demister containing porous material through which the gas must move and the step of sending is carried out in a conduit extending from the downstream side of the porous material to the step of cooling, and wherein the step of removing is effected in a tube extending from the conduit into the liquid substance separated in the step of separating.

* * * * *